(No Model.) 2 Sheets—Sheet 1.

G. P. VICKEN.

ATTACHMENT FOR MACHINES FOR CUTTING MOLDINGS.

No. 366,280. Patented July 12, 1887.

Attest
E. M. Harmon
W. S. Christopher

Inventor
George P. Vicken
per
Wm. Hubbell Fisher
Atty.

(No Model.) 2 Sheets—Sheet 2.

G. P. VICKEN.
ATTACHMENT FOR MACHINES FOR CUTTING MOLDINGS.

No. 366,280. Patented July 12, 1887.

Attest
E. M. Harmon
W. S. Christopher

Inventor
George P. Vicken
per Wm. Hubbell Fisher
Atty.

UNITED STATES PATENT OFFICE.

GEORGE P. VICKEN, OF CINCINNATI, OHIO.

ATTACHMENT FOR MACHINES FOR CUTTING MOLDINGS.

SPECIFICATION forming part of Letters Patent No. 366,280, dated July 12, 1887.

Application filed June 19, 1886. Serial No. 205,633. (No model.)

*To all whom it may concern:*

Be it known that I, GEORGE P. VICKEN, of the city of Cincinnati, Hamilton county, and State of Ohio, have invented certain new and useful Improvements in Attachments for Machines for Cutting Moldings, of which the following is a specification.

The various features of my invention, and the advantages resulting from their use, conjointly or otherwise, will be apparent from the following description and claims.

Figure 1:
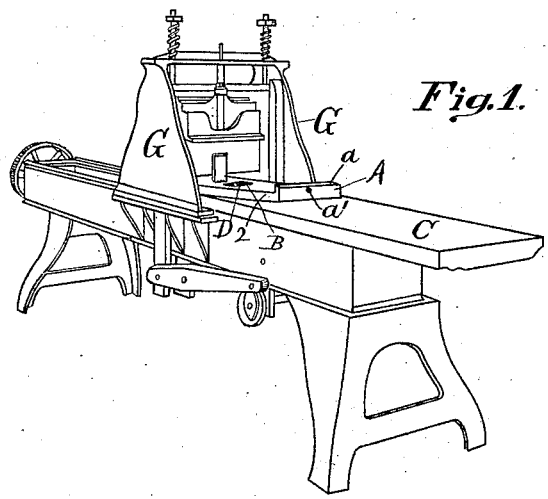
Figure 2:
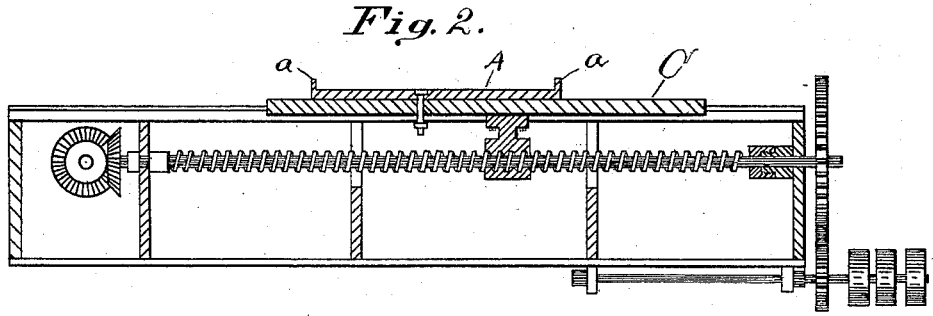
Figure 3:
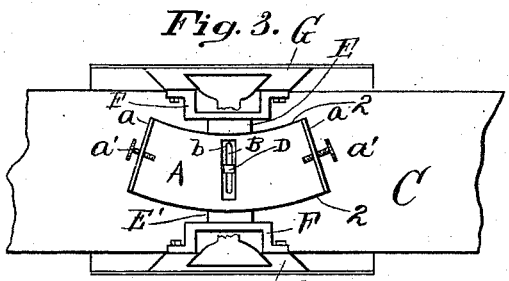
Figure 8:
Figure 4:
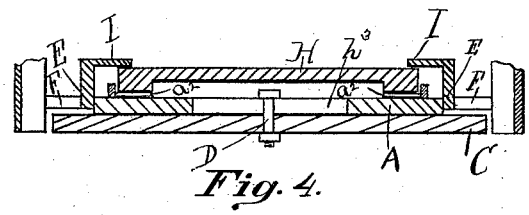
Figure 5:
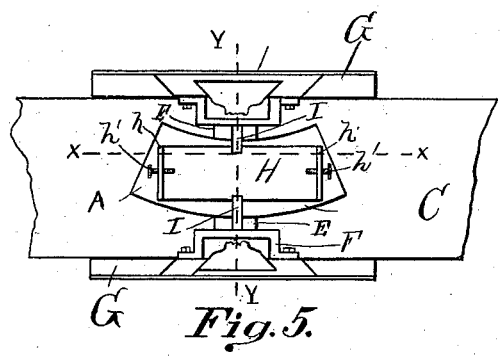
Figure 6:
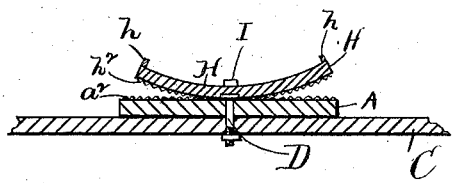
Figure 7:
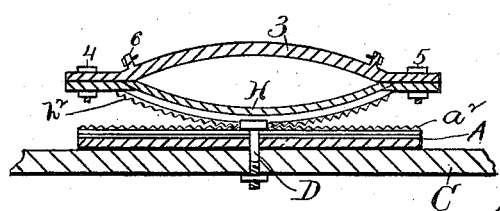

In the accompanying drawings, forming part of this specification, Figure 1 is a perspective view of a machine for cutting moldings provided with my improvements. Fig. 2 is a central longitudinal section of the bed of the machine and of one feature of my invention. Fig. 3 is a top view of the last-named feature of my invention in position on the machine, parts of the machine being broken away. Fig. 4 is a cross-section, taken at the dotted line Y Y of Fig. 5, of a device showing those features of my invention which enable the machine to cut curved moldings on a concave surface. Fig. 5 is a top view of the device shown in Fig. 4. Fig. 6 is a section taken at the line X X, Fig. 5. Fig. 7 is the last-named section, with the addition of a plate adapting the machine to be used for cutting moldings on a convex surface. Fig. 8 illustrates in general the curve of the molding cut by means of mechanism embodying the first feature of my invention, the curve being of a greater or less diameter, as desired.

I have shown this attachment as applied to a machine provided with a vertically-reciprocating knife or cutter; but this feature is not essential to its action, but it may be used where the wood to be cut and its support are caused to reciprocate to and from the knife, and for certain classes of simple moldings where the knife is stationary.

That feature of my invention—viz., which relates to cutting curved moldings on a plane or flat surface, consists, essentially, of a plate so constructed and combined with devices for feeding it forward or forward and backward and guiding it so that the plate shall have a curvilinear movement whose radius is in a plane at right angles to the line of the movement of the reciprocating knife. The plate A is flat. Its sides 2 2 are curved, one being convex and the other concave, and the two curves are parallel to each other. The ends of this flat arc-plate are preferably cut to radii of the curves, and each may be provided with an upwardly-projecting flange, $a$. The clamp-screws $a'$, passing through the flanges $a$, serve to hold the piece to be molded in position on the plate. Other means for this purpose may be employed instead, when desired. A transverse slot, B, is cut through the table or support A. The upper part of this slot is countersunk, forming the recess $b$. A bolt, D, passes through the slot B, and is attached to the main table C of the machine. The head of this bolt fits in the recess $b$, and holds the plate A in position on the table C. Two guides, E E', are provided, each of which has a curved end. The guide E has a convex curve to fit the concave side of the table A, and the guide E' has a concave curve to fit the convex side of the plate A. These guides are attached to stationary parts at the sides of the machine in a suitable manner. In the machine illustrated they are attached by means of the loops F to the standards G, supporting the knife-frame.

When it is desired to cut curved moldings on a concave surface, the auxiliary plate H (shown in Figs. 4, 5, and 6,) must also be used in addition to the plate A. The plate H is curved, as shown in section in Fig. 6, the curve being greater or less according to the curve of molding desired. At each end it is provided with a flange, $h$, and a clamp-screw, $h'$, to hold the piece to be cut in position. On each side of its under surface is a rack, $h^2$, which meshes with a corresponding rack, $a^2$, on the top of the plate A. Instead of countersinking the bolt D it is convenient to provide the under surface of the plate H with a recess, $h^3$, which accommodates the head of the bolt. The fingers I project horizontally inward from the guide E and rest on the top of the plate H.

The mode of operation is as follows: When the plate A alone is used, the piece to be cut is clamped to it and the machine started. As the table C moves it carries the plate A with it. The plate A, in passing between the guides E E', describes a curve similar to the curve of the two guides. The knife being stationary between the two guides, so far as lateral movement is concerned, molds the surface of the piece in curves like the curve in which the plate A moves. When both plates A and H are used, their motions are combined and their resultant is the cutting of curved lines on a concave surface. As the plate A is moved between the guides E E' it carries with it the plate H, and moves this latter bodily in the same curve which the guides E E' impart to the plate A. The plate H is in addition guided in its movement by the fingers I. The plate H, passing under these fingers I, is kept by them at all times tangent to the flat plate A at the line of the knife. By the combined action of the two plates curved moldings may be cut on concave surfaces. By the addition of the plate 3, upwardly convex, located upon the plate H and suitably secured to the latter, (preferably by bolts 4 5 through flanges on the plates 3 and H,) curved moldings can be cut on concave surfaces. The plate 3 is provided with suitable lugs, 6 and 7, or other means for securing the wood in position thereon to be molded.

The outside or edge configuration of the piece in which the molding is to be cut may be of any desired kind or description—straight or curved, plain or ornamental; but the curved molding to be cut, as 8, (see Fig. 8, where is shown a piece of wood showing the line of such a molding,) will be of that curve imparted to the supporting-plate on which the wood rests by means of the mechanism for guiding it— viz., as the guides E E', or equivalent means.

The attachment is especially adapted for cutting moldings on the so-called "half-round" chair-backs; but its use may be extended to other articles having either a plane or concave or convex surface, and on which it is desired to cut curved moldings.

So much of the device herein shown and described, as is also shown and described in my applications Nos. 203,974 and 204,295, is herein disclaimed.

What I claim as new and of my invention, and desire to secure by Letters Patent, is—

1. The combination of the movable table C, the flat plate A, having curved edges and secured to said table, and stationary guides E E', arranged to bear against the edges of the plate A, substantially as and for the purposes specified.

2. The combination of the movable table C, the flat arc-plate A, provided with slot B, secured to said table C by the bolt D, and the lateral guides E E', for directing the flat arc-plate A, substantially as and for the purposes specified.

3. As an attachment to a machine for cutting moldings, the combination of the flat plate A, having curved edges and provided on its upper surface with rack $a^2$, the curved plate H, provided on its convex surface with the rack $h^2$, the said rack $h^2$ meshing with the rack $a^2$, and stationary guides E E', provided with the fingers I, substantially as and for the purposes specified.

4. In a machine for cutting moldings, the combination of the table C, plate A, having slot B, and provided with racks $a^2$, bolt D, plate H, provided with racks $h^2$, flanges $h$, and clamp-screws $h'$, guides E and E', provided with fingers I, substantially as and for the purposes specified.

5. In a machine for cutting moldings, the combination of the flat arc-plate A, having rack $a^2$ on its upper surface, and curved plates 3 and H, united to each other with their concave surfaces facing, and the latter plate, H, provided with the rack $h^2$, which meshes with the rack $a^2$ of the plate A, substantially as and for the purposes specified.

GEO. P. VICKEN.

Witnesses:
M. M. SMITH,
JNO. W. STREHLI.